United States Patent
Gaully et al.

(10) Patent No.: US 9,732,764 B2
(45) Date of Patent: Aug. 15, 2017

(54) DEVICE AND METHOD FOR POSITIONING VARIABLE-GEOMETRY EQUIPMENT FOR A TURBOMACHINE, USING A RELATIVE-MEASUREMENT JACK

(75) Inventors: Bruno Robert Gaully, Marolles en Hurepoix (FR); Jean-Albert Paul Marc Robert, Paris (FR)

(73) Assignee: SNECMA, Paris (FR)

( * ) Notice: Subject to any disclaimer, the term of this patent is extended or adjusted under 35 U.S.C. 154(b) by 1637 days.

(21) Appl. No.: 13/379,869

(22) PCT Filed: Jun. 23, 2010

(86) PCT No.: PCT/EP2010/058953
§ 371 (c)(1),
(2), (4) Date: Dec. 21, 2011

(87) PCT Pub. No.: WO2010/149724
PCT Pub. Date: Dec. 29, 2010

(65) Prior Publication Data
US 2012/0107088 A1 May 3, 2012

(30) Foreign Application Priority Data
Jun. 26, 2009 (FR) ...................................... 09 54376

(51) Int. Cl.
*F01D 17/02* (2006.01)
*F04D 29/56* (2006.01)
(Continued)

(52) U.S. Cl.
CPC .......... *F04D 29/563* (2013.01); *F01D 17/16* (2013.01); *F01D 17/24* (2013.01); *F02C 9/22* (2013.01);
(Continued)

(58) Field of Classification Search
CPC ...... F01D 17/16; F01D 17/24; F04D 27/0246; F04D 29/323; F04D 29/563; F02C 9/22
(Continued)

(56) References Cited

U.S. PATENT DOCUMENTS

2002/0034439 A1   3/2002   Caubet et al.
2002/0081194 A1   6/2002   Garrett
(Continued)

FOREIGN PATENT DOCUMENTS

EP   1 188 933   3/2002
EP   1 197 637   4/2002
(Continued)

OTHER PUBLICATIONS

International Search Report Issued Aug. 4, 2010 in PCT/EP10/58953 Filed Jun. 23, 2010.

*Primary Examiner* — Gregory Anderson
*Assistant Examiner* — Maxime Adjagbe
(74) *Attorney, Agent, or Firm* — Oblon, McClelland, Maier & Neustadt, L.L.P.

(57) ABSTRACT

A device for controlling positioning of variable-geometry equipment of a turbomachine, including a computer, an actuator of variable geometry driven by the computer, and a drive train, the actuator including moving parts including a sensor for measuring its elongation, the drive train being connected at one of its ends to a point of attachment of the moving parts and at another end to a point of attachment of the equipment, the point of attachment moving under action of the actuator along a travel limited by an end stop and the drive train being elastically deformable under the action of the actuator when the point of attachment is against the end stop. An elongation instruction supplied by the computer to the moving parts is defined as a difference with respect to the
(Continued)

value of the elongation of the moving parts that corresponds to contact between the point of attachment and the end stop.

6 Claims, 2 Drawing Sheets

(51) Int. Cl.
*F01D 17/16* (2006.01)
*F01D 17/24* (2006.01)
*F02C 9/22* (2006.01)
*F04D 27/02* (2006.01)
*F04D 29/32* (2006.01)

(52) U.S. Cl.
CPC ....... *F04D 27/0246* (2013.01); *F04D 29/323* (2013.01); *F05D 2260/79* (2013.01)

(58) Field of Classification Search
USPC .................................................. 415/159, 160
See application file for complete search history.

(56) References Cited

U.S. PATENT DOCUMENTS

| | | |
|---|---|---|
| 2007/0068303 A1 | 3/2007 | Bouru |
| 2008/0273965 A1 | 11/2008 | Rajamani et al. |
| 2010/0080684 A1 | 4/2010 | Colotte et al. |
| 2010/0158662 A1 | 6/2010 | Colotte et al. |
| 2010/0158663 A1 | 6/2010 | Colotte et al. |
| 2011/0182716 A1 | 7/2011 | Bouru et al. |
| 2011/0184573 A1 | 7/2011 | Colotte et al. |
| 2011/0190950 A1 | 8/2011 | Colotte et al. |
| 2011/0229310 A1 | 9/2011 | Colotte et al. |

FOREIGN PATENT DOCUMENTS

| | | |
|---|---|---|
| EP | 1 760 336 | 3/2007 |
| EP | 1 988 258 | 11/2008 |
| WO | WO 2010/149725 A1 | 12/2010 |

DEVICE AND METHOD FOR POSITIONING VARIABLE-GEOMETRY EQUIPMENT FOR A TURBOMACHINE, USING A RELATIVE-MEASUREMENT JACK

BACKGROUND OF THE INVENTION

Field of the Invention

The field of the present invention is that of items of variable-geometry equipment and the control of their positioning, and more particularly that of the items of variable-geometry equipment mounted on turbomachines.

Description of the Related Art

Several items of equipment on a turbomachine can be mounted so as to be able to be moved in rotation or in translation, whether it be for example of the variable-setting stator blades which are oriented more or less in the direction of the air stream of a high-pressure compressor, of the discharge valves which are opened or closed so as to increase, if necessary, the surge margin of a compressor or else of the movable blades of a compressor or of a variable-pitch propeller.

These items of variable-geometry equipment are moved by kinematic systems actuated by jacks or any other actuator, as indicated in patent application EP 1724472 by the applicant, and their position is defined by a law establishing a relationship between the stroke of the jack and the position desired for the item of equipment in question. Moreover, a device for controlling the position of the item of variable-geometry equipment is known, as described in application EP 1988258, wherein the position of the item of equipment is detected by an end-of-stroke sensor.

The position is very often driven by a closed-loop control which loops on the desired position. The position of the rod of the jack is known by virtue of a sensor of the LVDT (for linear variable displacement transducer) kind which follows the movements of the jack rod and transmits them to the device for controlling the position of the kinematic system. These sensors are usually sensors of the absolute positioning type, that is to say that they indicate the position of the jack rod relative to a fixed reference, associated with the body of the jack or with the item of equipment itself.

This closed-loop control usually loops on the position of the jack rod and not on that of the item of equipment in question. The stroke of the jack may be perfectly controlled but correspond to an incorrect position of the item of equipment if clearances appear, for example by wear throughout the life of the machine, or else if major damage such as a breakage occurs in the kinematic system placed downstream of the jack.

As an example, wear is frequently encountered in the retaining bushes of the variable-setting stator blades (or variable stator vanes—VSV) and, consequently to see a considerable clearance in their positioning and a lack of precision in the control of this item of equipment.

The lack of precision in the positioning of the current systems leads the designers of turbomachines to provide margins in the dimensioning of the law for controlling items of variable-geometry equipment. Specifically they must take account of the difference that is likely to appear during the life of an item of equipment between its real position and that which the control system wishes it to take. In the particular case of an item of compressor equipment, for which protection should be taken in use against the surging phenomenon, the corresponding margins resulting in an adaptation of the compressor that is not optimal, the operating point being chosen further from the surging line than it should be, in order to take account of future wear and of the tolerance deviations associated with the lack of precision in the setting of the blades that results therefrom.

Moreover, during installation, the operator must ensure a precise positioning of the item of equipment in order to avoid further increasing the lack of precision in the positioning in operation. Such an operation is time-consuming and may cause possible handling errors.

BRIEF SUMMARY OF THE INVENTION

The object of the present invention is to remedy these drawbacks by proposing a device for positioning an item of variable-geometry equipment and its associated control system, which does not reproduce some of the defects of the existing devices and, in particular, which is not sensitive to an imprecise positioning of these items of equipment. It also proposes a method for the positioning of the associated device.

Accordingly, the subject of the invention is a device for controlling the positioning of an item of variable-geometry equipment of a turbomachine comprising a computer, an actuator for actuating said variable geometry driven by the computer and a kinematic system, said actuator comprising a movable assembly furnished with a sensor for measuring its elongation, said kinematic system being connected at one of its ends to a coupling point of said movable assembly and at the other end to an attachment point of the item of equipment, the attachment point moving under the action of the actuator along a stroke limited by an abutment and the kinematic system being able to be deformed elastically under the action of the actuator when the attachment point is on the abutment, characterized in that the elongation setpoint supplied by the computer to said movable assembly is defined as a difference relative to the value of the elongation of the movable assembly which corresponds to the contact of the attachment point with the abutment.

Using as reference the value of elongation corresponding to the abutment dispenses with the clearances that may exist in the kinematic system and it is possible to detect a possible break in the kinematic system. It is therefore possible to reduce the margins capable of ensuring correct operation of the turbomachine.

Preferably the computer detects the value of elongation of the movable assembly which corresponds to the contact of the attachment point with the abutment by sending to the actuator at least one setpoint of movement of its movable assembly beyond the position corresponding to the placement in abutment of the attachment point.

Sending the actuator beyond the abutment results in a change in at least one of the operating characteristics of the jack on passing over this abutment, which makes it possible to detect the true arrival at the abutment of the attachment point of the variable geometry. Based on the knowledge of the real value of the elongation corresponding to the contact on the abutment and on the knowledge that appeared in the control logic, it is possible to reset the control logic and consequently to reduce the margins during the design of this control logic.

Advantageously, the device also comprises a means for measuring the force delivered by the actuator and said computer is adapted to collect the change over time of the torque {elongation of the movable assembly—force delivered by the actuator} during a movement of the movable assembly in response to a setpoint transmitted from said movable assembly beyond the position corresponding to the placement in abutment of the attachment point.

In a particular embodiment, said computer is adapted to detect an inflection point on the curve giving the change in the force delivered by the actuator over time.

Yet more preferably, said computer is adapted to reset, in its control logic for controlling the positioning of the kinematic system, the elongation of the movable assembly corresponding to the contact of the attachment point with the abutment on that corresponding to the force delivered by the actuator to said inflection point.

It is therefore possible to reset regularly, for example during each use, the control logic of the item of equipment and to react as soon as there is a tolerance deviation due to wear or deterioration of the kinematic system.

The invention also relates to a method for controlling the positioning, by means of a kinematic system, of an item of variable-geometry equipment of a turbomachine by the elongation to be given to a movable assembly of an actuator, said actuator being furnished with a sensor for measuring said elongation and with a means for measuring the force delivered by the actuator, said kinematic system being connected at one of its ends to a coupling point of said movable assembly and at the other end to an attachment point of said item of equipment, the attachment point moving under the action of the actuator along a stroke limited by an abutment and the kinematic system being able to be deformed elastically under the action of the actuator when the attachment point is on the abutment, comprising the following steps:
a) sending to the actuator a setpoint of movement of its movable assembly beyond the position corresponding to the placement in abutment of the attachment point,
b) measuring the value of at least one torque {elongation of the movable assembly—force delivered by the actuator} during a movement of said movable assembly,
c) computing the value of the elongation of the movable assembly which corresponds to the contact of the attachment point with the abutment based on the measurement of the force delivered by the actuator and on the at least one measured torque,
d) defining the elongation to be given in use to the movable assembly by its difference relative to the value computed above.

Preferably, step b) consists in collecting the change over time in the torque {elongation of the movable assembly—force delivered by the actuator} during the movement of the movable assembly following a transmitted setpoint from said movable assembly beyond the position corresponding to the placement in abutment of the attachment point and step c) consists in detecting an inflection point on the curve giving the change in the force delivered by the actuator over time.

Finally, the invention relates to a turbomachine fitted with an item of variable-geometry equipment of which the positioning is controlled by a device as described above and to a computer of a turbomachine in which a computing module is installed implementing one of the methods described above.

BRIEF DESCRIPTION OF THE SEVERAL VIEWS OF THE DRAWINGS

The invention will be better understood and other objects, details, features and advantages of the latter will appear more clearly during the following detailed explanatory description of an embodiment of the invention given as a purely illustrative and nonlimiting example, with reference to the appended schematic drawings.

In these drawings.

DETAILED DESCRIPTION OF THE INVENTION

Figure 1:
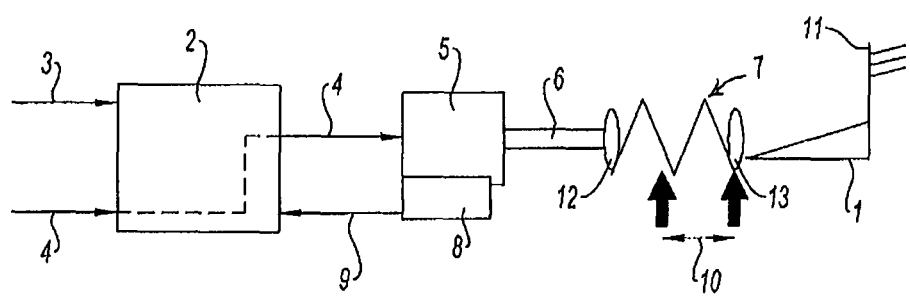
FIG. 1 is a schematic view of the control system of an item of variable-geometry equipment according to one embodiment of the invention.

With reference to FIG. 1, it shows a system for controlling an item of variable-geometry equipment 1 comprising a computer 2 which receives, over a setpoint line 3, a setpoint for the desired position of the item of equipment 1 and which acts on the power supplied by a power line 4 to an actuator of the jack type 5. At the output of the computer 2, the power line 4 actuates the jack 5 and its movable assembly 6 of the jack rod type, in order to modify, by means of a kinematic system 7, the position of the item of variable-geometry equipment 1. The jack rod 6 is connected to the kinematic system at a coupling point 12 and the kinematic system moves the item of equipment 1 via an attachment point 13. A sensor 8 permanently measures the position of the jack rod 6 and transmits it to the computer 2 with the aid of a loop-back line 9. The computer constantly computes the difference between the position seen by the sensor 8 and that which corresponds, for a nominal operation of the kinematic system 7, to the desired position and it acts in consequence on the power line 4 to reduce this difference and bring it progressively to zero.

It should be noted that the control system is in this instance described with a closed-loop control over the position of the jack rod, but the invention can perfectly be produced with a direct system comprising no closed-loop return.

Because of the wear that appears with time or because of a possible break, a clearance 10 occurs in the kinematic system 7 which generates a difference, in one direction or in the other, between the real position of the item of equipment 1 and that which is demanded by the jack rod 6.

FIG. 1 also shows an abutment 11 corresponding to one of the end-of-stroke positions of the item of variable-geometry equipment 1. Abutments of this type may be, for example, the abutments on the high-pressure housing for the VSV kinematic system rings, the abutments on the intermediate housing for the gates of the discharge valves of the compressors or else the maximum and minimum abutments for the pitch of an airfoil or of a propeller. The presence of at least one abutment on the stroke of the attachment point of the item of equipment is an essential element for the embodiment of the invention.

Figure 2:
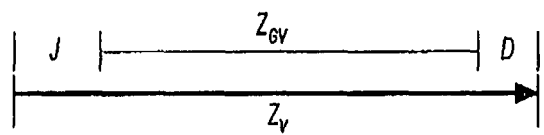
FIG. 2 is a comparative schematic view of the stroke of an item of variable-geometry equipment and of the movable assembly of the jack that actuates it.

FIG. 2 represents in a comparative manner the movement of the coupling point 12 of the jack rod 6 on the kinematic system 7 and the real movement of the attachment point 13 of the kinematic system on the item of equipment 1 during an actuation of the item of equipment 1 in order to make it travel from a position on one of its abutments to a position on the other abutment. Although the jack rod 6 moves on a stroke $Z_V$, the attachment point 13 does not move first of all, and this over the equivalent of a stroke J corresponding to making up the clearance 10. Once the clearance 10 of the kinematic system is made up, the item of equipment travels over its effective stroke $Z_{GV}$, that is to say the stroke going from one abutment to the other. FIG. 2 shows a stroke of the jack $Z_V$ that is greater than its effective stroke, that is to say than that which would correspond, in nominal conditions of the kinematic system, to the movement $Z_G$ of the item of equipment 1 between its abutments. Since the stroke required of the jack rod 6 is greater than its effective stroke on the side of the end-of-stroke abutment, the jack 5 rests at the end of its stroke on the kinematic system 7 which can no longer progress because of the abutment 11, and then generates a mechanical deformation of this kinematic system. Doing so, the coupling point 12 of the jack continues to progress by a length D which corresponds to the elasticity of the parts forming the kinematic system 7.

Figure 3:
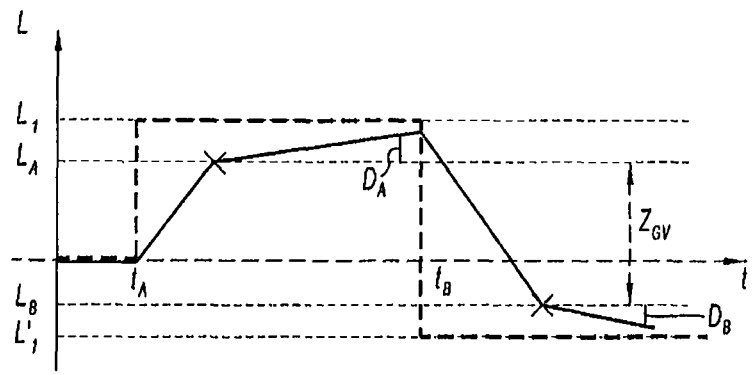
FIG. 3 is a view giving, on the one hand, the command of movement according to the invention, addressed to an item of variable-geometry equipment and, on the other hand, the movement actually made by the item of equipment in response to this command.
Figure 4:
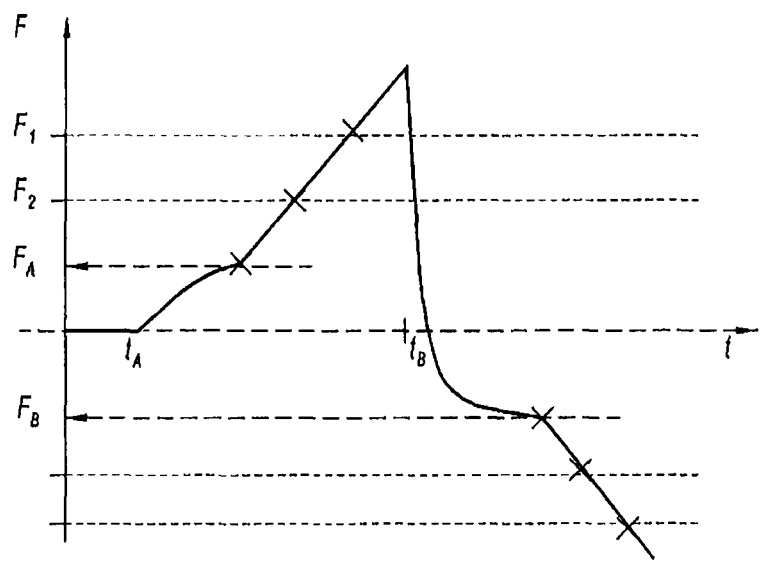
FIG. 4 is a view of the forces applied by the jack for controlling an item of variable-geometry equipment according to the invention, during a movement such as that commanded in FIG. 3.

With reference to FIGS. 3 and 4, they show the movement L (FIG. 3) of the coupling point 12 of the jack rod 6 and the force F (FIG. 4) developed by the jack 5 during a command to move the item of equipment 1 from a given starting position to a first end-of-stroke abutment 11, referenced A, against which the item of equipment is pushed by the jack 5; this first movement is followed by a second movement which goes from this first abutment A to a second abutment, referenced B, the jack 5 this time acting in the direction that is the reverse of the preceding one.

FIG. 3 shows two curves, one (dashed) showing the position required by the computer 2 and the other (as a solid line) showing the real position of the coupling point 12 of the jack during the movement indicated above. The command is first of all at zero, that is to say that no action is required of the jack which therefore leaves the attachment point 13 in the position it occupied before. After a request to change the position of the item of equipment 1, received by the computer over the setpoint line 3, the latter transmits to the jack 5, at the moment $t_A$, an order to move the attachment point 13 to the first abutment A, in order to remain there for a given time $t_B$–$t_A$. After the time $t_B$, the computer 2 transmits an instruction to move the attachment point 13 from the first abutment A to the second abutment B.

At the moment $t_A$, the coupling point 12 moves from its initial position toward the abutment 11 at the speed corresponding to that of the movement of the jack rod 6 in the jack 5. The attachment point 13 moves by as much, once the possible clearance 10 has been resorbed. When the attachment point 13 reaches the first abutment A, the jack 5 continues its stroke up to the time $t_B$ and the coupling point 12 of its rod continues its progression over a distance $D_A$, because of the deformation permitted by the elasticity of the kinematic system 7.

At the moment $t_B$, the pressure is reversed in the jack 5 and the attachment point 13 is now commanded to come to the second abutment B. Since the attachment point 13 initially remains still in contact with the abutment A, the coupling point 12 of the rod returns to a position of relaxing the bearing stress on this abutment, by removing the retraction $D_A$ that results from the elasticity of the kinematic system 7. The rod 6 of the jack continues its retraction while first of all making up the clearance J that possibly exists in this direction in the kinematic system and then moves the attachment point 13 toward to the second abutment B. As above, when the attachment point 13 reaches the second abutment B, the rod 6 of the jack 5 continues its stroke over a distance $D_B$ permitted by the elasticity of the kinematic system 7.

In parallel, the force exerted by the jack, as shown in FIG. 4, changes from $t_A$ while remaining initially relatively weak and equal to the value necessary to the movement of the kinematic system 7 and of the item of variable-geometry equipment 1. Once the attachment point 13 has reached the first abutment A, the setpoint sent by the computer 2 is to continue the action of the jack in order to reach a position beyond the abutment. The force exerted by the jack then increases suddenly, in reaction to the counter-force exerted by the abutment. The curve of FIG. 4 therefore shows a pronounced inflection at the moment $t_A$.

From the time $t_B$, the force exerted by the jack decreases suddenly and is then applied in the reverse direction, toward the second abutment B.

A device and a method will now be described for working around the problems of wear in the control of the items of variable-geometry equipment of a turbomachine and the tolerance deviations in the measurements resulting therefrom, and moreover making it possible to detect a possible break in the system for controlling these items of equipment.

It should be noted that, usually in the prior art, the sensor 8 is an absolute-measurement sensor which evaluates the elongation of the jack rod 6 from a fixed reference. This reference may, for example, be the body of the jack, the measurement of the elongation then relating to the length of the rod which protrudes from said body. In the invention, on the other hand, the measurement in use of the elongation of the jack rod is taken relative to a position that is not known a priori, and that is defined when the item of equipment 1 is placed in abutment.

The invention first of all proposes to place one, and preferably two, mechanical abutments as close as possible to the variable geometries and then to go and reset, in a regular manner in use or periodically throughout the life of the motor, the position of the jack rod 6 by sending the item of equipment 1 to one of these abutments.

The method consists in determining the elongation of the jack rod 6 which corresponds to the position of an abutment 11 on which the attachment point 13 of the item of variable-geometry equipment 1 butts, taking this value as reference for the elongations that will be required of the jack 5 by the computer 2 and from then onwards defining the position setpoint of the jack rod 6 by a difference with respect to this reference value.

This reference value being determined, the position that the jack rod 6 takes becomes independent of the clearances that may exist in the kinematic system. This then brings us back to a perfectly controlled driving of the position of the item of equipment 1. It is therefore no longer necessary to apply margins to compensate for wear as was the case in the prior art. It is moreover possible to detect whether a break has occurred in the drive system because, in this case the item of equipment 1 will never reach its abutment and no elongation of the jack rod will correspond to a position of the item of equipment on the abutment 11.

To ascertain the position of the jack rod 6 that corresponds to the item of equipment 1 being in contact with the abutment 11, the operator sends, by means of the setpoint line 3, a setpoint for deployment to a position L1, intentionally situated beyond the chosen abutment 11.

The computer 2 knows during the movement of the jack, both the force F1 transmitted by the jack 5, by virtue of the value that it gives to the power line 4, and the position L1 of the jack rod 6, by means of the sensor 8. In so doing, it is capable of reproducing the curve appearing in FIG. 4.

Analyzing this curve makes it possible to determine an inflection point $F_A$ which corresponds to the elongation $L_A$ of the jack for which the item of equipment 1 is on the abutment 11. It is this value that is then taken as reference for the subsequent positionings of the jack rod.

This produces a device and a method that make it possible to work around the wear that appears in the kinematic system 7 and to detect possible breaks in this kinematic system.

Although the invention has been described with reference to a particular embodiment, it is quite clear that it includes all the technical equivalents of the means described and their combinations if the latter enter into the context of the invention.

The invention claimed is:

1. A device for controlling positioning of an item of variable-geometry equipment of a turbomachine, comprising:
   a computer;
   an actuator for actuating the variable geometry driven by the computer and a kinematic system, the actuator comprising a movable assembly including a sensor for measuring its elongation, the kinematic system being connected at one of its ends to a coupling point of the movable assembly and at another end to an attachment point of the item of equipment, the attachment point moving under action of the actuator along a stroke limited by an abutment on which said attachment point is able to abut and the kinematic system configured to be deformed elastically under the action of the actuator when the attachment point is on the abutment,
   wherein an elongation setpoint supplied by the computer to the movable assembly is defined by taking as reference a value of the elongation of the movable assembly when said attachment point abuts on said abutment.

2. The device as claimed in claim 1, wherein the computer detects the value of elongation of the movable assembly that corresponds to the contact of the attachment point with the abutment by sending to the actuator at least one setpoint of movement of its movable assembly beyond a position corresponding to placement in abutment of the attachment point.

3. The device as claimed in claim 2, further comprising means for measuring force delivered by the actuator,
   wherein the computer is programmed to collect change over time of torque created by the elongation of the movable assembly and the force delivered by the actuator during a movement of the movable assembly in response to a setpoint transmitted from the movable assembly beyond the position corresponding to the placement in abutment of the attachment point.

4. The device as claimed in claim 3, wherein the computer is programmed to detect an inflection point on a curve giving the change in the force delivered by the actuator over time.

5. The device as claimed in claim 4, wherein the computer is programmed to reset, in its control logic for controlling the positioning of the kinematic system, the elongation of the movable assembly corresponding to the contact of the attachment point with the abutment on that corresponding to the force delivered by the actuator to the inflection point.

6. A turbomachine comprising an item of variable-geometry equipment of which the positioning is controlled by a device as claimed in claim 1.

* * * * *